(12) United States Patent
Kadrmas et al.

(10) Patent No.: US 10,900,193 B2
(45) Date of Patent: Jan. 26, 2021

(54) PUMPING UNIT BASES WITH DRIVEN PILES

(71) Applicant: Weatherford Technology Holdings, LLC, Houston, TX (US)

(72) Inventors: Brandon Lee Kadrmas, Dickinson, ND (US); Clark E. Robison, Tomball, TX (US); Chuck Robert Bradley, Stillwater, OK (US); Jordan Gerard Binstock, South Heart, ND (US); Travis Rice, Williston, ND (US)

(73) Assignee: Weatherford Technology Holdings, LLC, Houston, TX (US)

( * ) Notice: Subject to any disclaimer, the term of this patent is extended or adjusted under 35 U.S.C. 154(b) by 791 days.

(21) Appl. No.: 15/345,674

(22) Filed: Nov. 8, 2016

(65) Prior Publication Data
US 2018/0127943 A1    May 10, 2018

(51) Int. Cl.
| | | |
|---|---|---|
| *E02D 27/04* | (2006.01) | |
| *E02D 27/44* | (2006.01) | |
| *E02D 5/28* | (2006.01) | |
| *E02D 5/52* | (2006.01) | |
| *E02D 7/02* | (2006.01) | |
| *E21B 15/00* | (2006.01) | |
| *F16M 5/00* | (2006.01) | |
| *E02D 7/08* | (2006.01) | |
| *E02D 7/12* | (2006.01) | |
| *E02D 7/18* | (2006.01) | |
| *E21B 43/12* | (2006.01) | |

(52) U.S. Cl.
CPC ............. *E02D 27/44* (2013.01); *E02D 5/285* (2013.01); *E02D 5/523* (2013.01); *E02D 5/526* (2013.01); *E02D 7/02* (2013.01); *E21B 15/00* (2013.01); *F16M 5/00* (2013.01); *E02D 7/08* (2013.01); *E02D 7/125* (2013.01); *E02D 7/18* (2013.01); *E02D 2200/1607* (2013.01); *E02D 2250/00* (2013.01); *E02D 2300/0029* (2013.01); *E02D 2600/20* (2013.01); *E21B 43/127* (2013.01); *F16M 2200/08* (2013.01)

(58) Field of Classification Search
CPC ......... E02D 27/44; E02D 5/285; E02D 5/523; E02D 5/526; E02D 7/02; E02D 7/08; E02D 7/125; E02D 7/18; E02D 2200/1607; E02D 2250/00; E02D 2300/0029; E02D 2600/20; E21B 15/00; E21B 43/127; F16M 5/00; F16M 2200/08
See application file for complete search history.

(56) References Cited

U.S. PATENT DOCUMENTS

| | | | | |
|---|---|---|---|---|
| 5,951,207 A | * | 9/1999 | Chen ........................ | E02D 7/02 405/228 |
| 6,094,873 A | * | 8/2000 | Hoffman ................. | E02D 27/01 52/126.6 |
| 8,959,980 B2 | * | 2/2015 | Vodnick ............... | G01B 21/047 73/1.89 |

(Continued)

*Primary Examiner* — Yong-Suk (Philip) Ro
(74) *Attorney, Agent, or Firm* — Patterson + Sheridan, LLP

(57) ABSTRACT

A pumping unit base and methods for producing oil and gas with the pumping unit base. The pumping unit base may include a plurality of driven piles installed in the ground, and a metal platform fixedly attached to the plurality of driven piles, wherein the metal platform is positioned above the ground. The metal platform may be removed from the driven piles and reinstalled to the driven piles.

18 Claims, 10 Drawing Sheets

(56) References Cited

U.S. PATENT DOCUMENTS

| | | |
|---|---|---|
| 9,365,998 B2 | 6/2016 | Perko |
| 2013/0309024 A1 | 11/2013 | Jones |
| 2014/0119838 A1 | 5/2014 | Perko |
| 2016/0281907 A1 | 9/2016 | Perko |

* cited by examiner

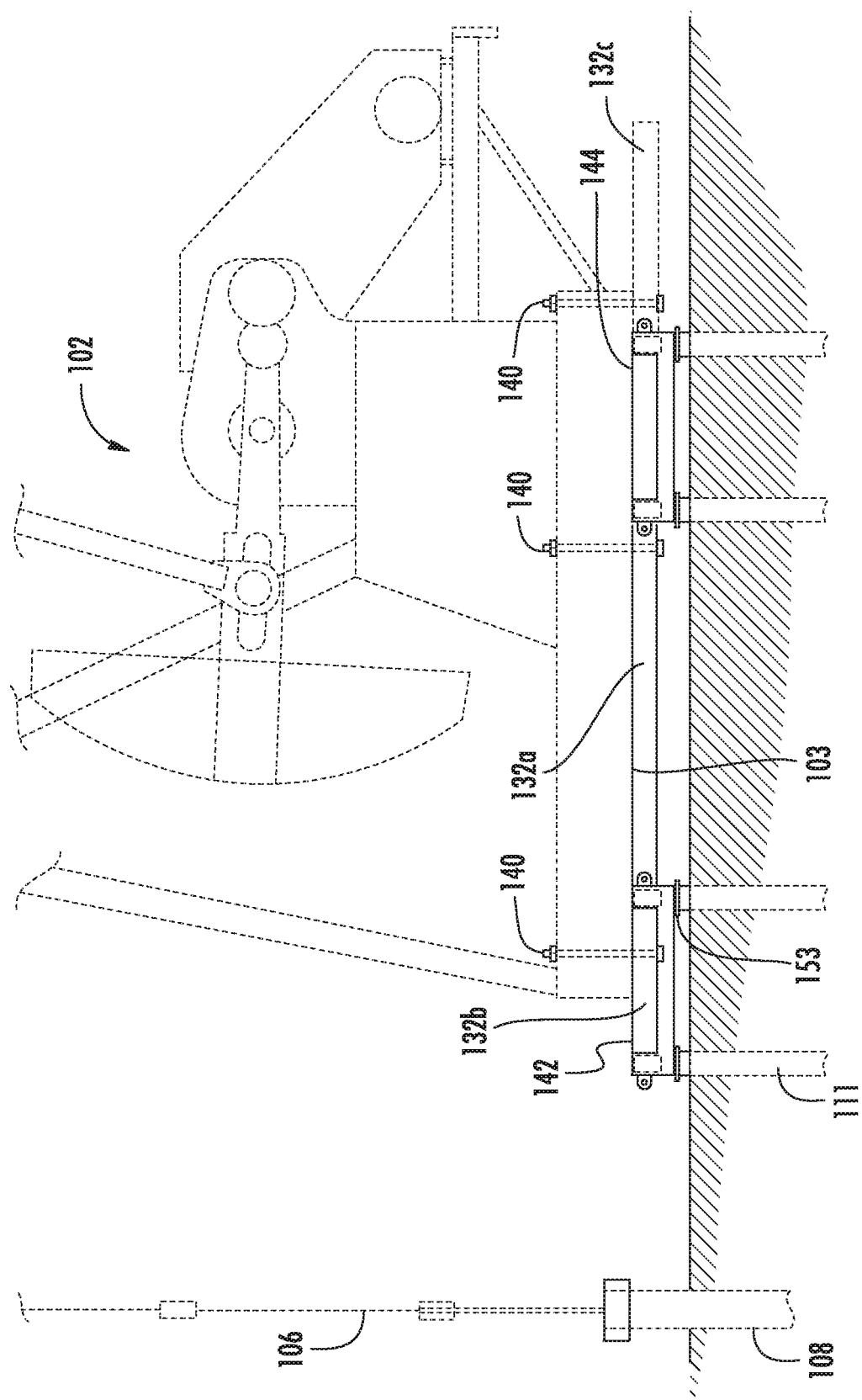

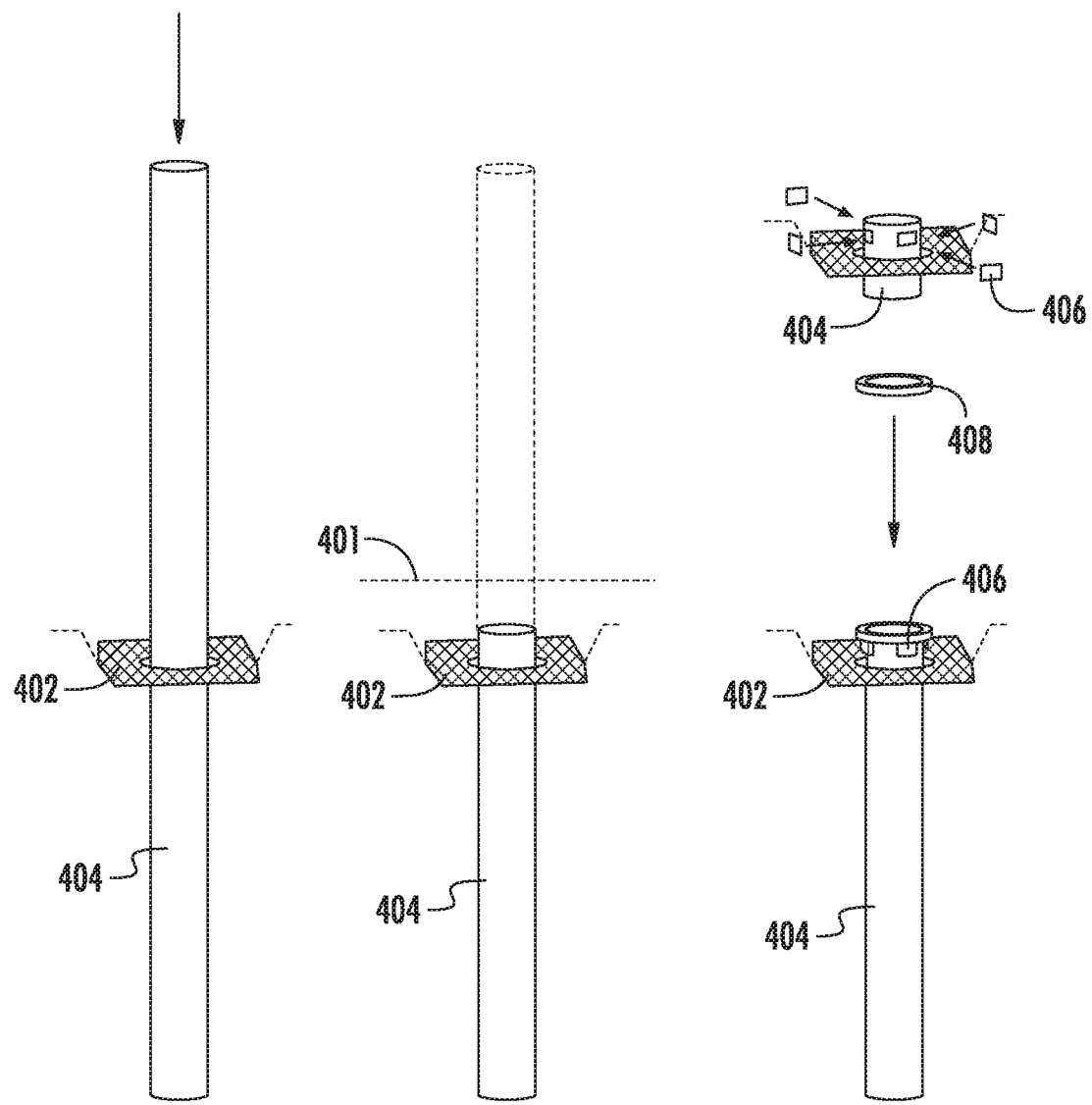

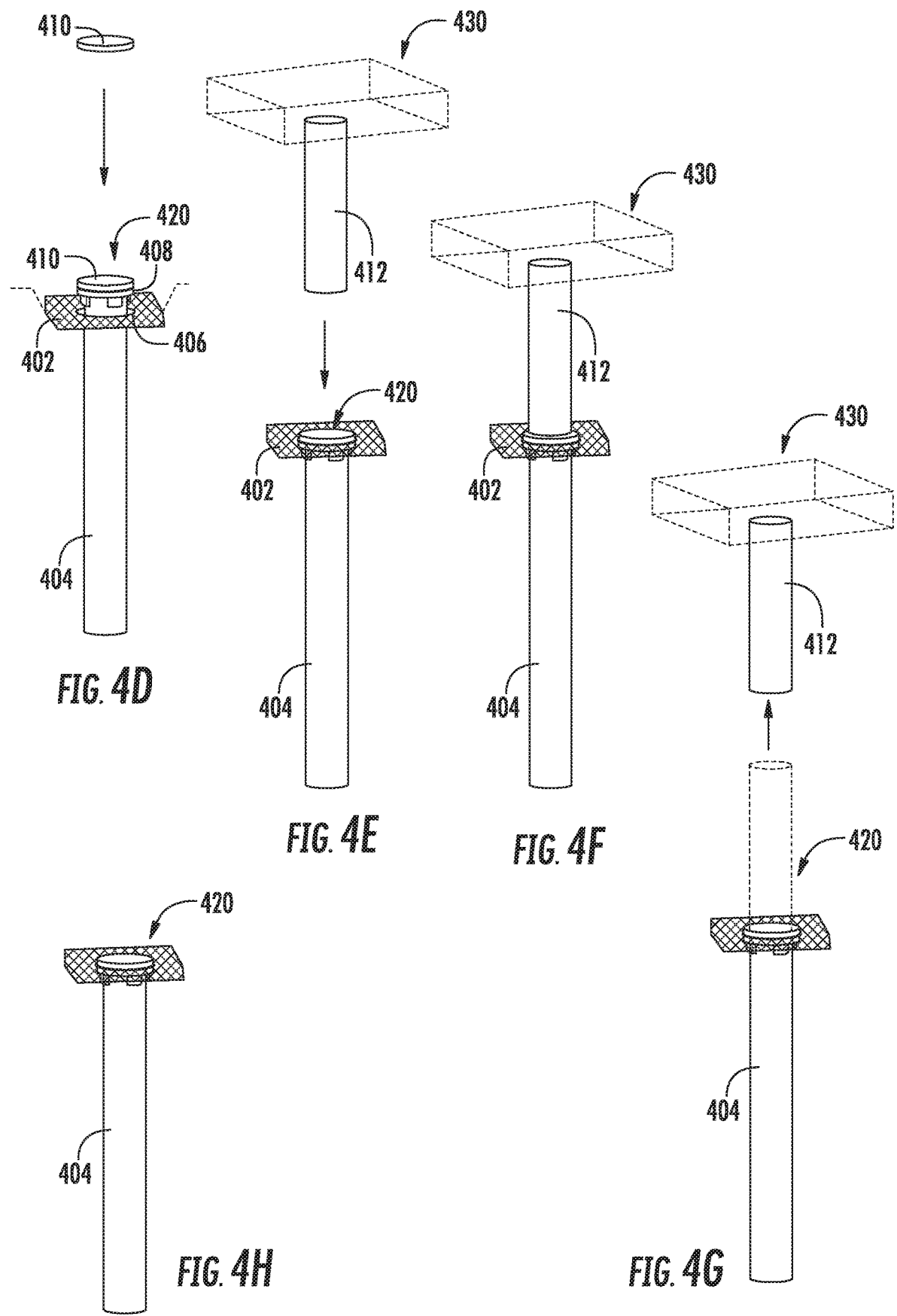

PUMPING UNIT BASES WITH DRIVEN PILES

BACKGROUND

Field

Embodiments of the present disclosure generally relate to pumping unit bases that are mounted on driven plies pile mounted and methods for removing and reinstalling the bases.

Description of the Related Art

In oil and gas production, after a producing well is drilled, a pumping unit is usually placed over the well to produce oil and gas from the formation. A pumping unit is usually disposed on a base, such as a concrete slab. Concrete slabs may be positioned over ground on piles or piers to avoid misalignment with the wellhead caused by changes in ground condition, such as freezing and defrosting of top soil.

However, traditional pumping unit bases are fixed to the piles or piers and permanently cover the areas around the wellhead. Once a traditional pumping unit base is set in position, removing the pumping unit base can be prohibitively expensive and may pose a safety risk. Therefore, it is not feasible to remove a traditional pumping unit base to permit other operations, such as restructuring the driven piles, repositioning the driven piles for a different pumping unit, reworking of the well, or drilling a new wellbore near the pumping unit base with a rig.

Therefore, there is a need for removable pumping unit bases.

SUMMARY

Embodiments of the present disclosure generally relate to a pumping unit base having a steel frame attached to piles, and methods for removing and reinstalling of the pumping unit base.

One embodiment of the present disclosure provides a pumping unit base. The pumping unit base may include a plurality of driven piles installed in the ground, and a metal platform fixedly attached to the plurality of driven piles, wherein the metal platform is positioned above the ground.

Another embodiment of the present disclosure provides a method for producing oil and gas from a wellbore. The method includes installing a plurality of driven piles into the ground near the wellbore, attaching a metal platform to the plurality of driven piles, installing a pumping unit on to the metal platform, and producing oil and gas from the wellbore with the pumping unit.

Another embodiment of the present disclosure provides a pumping system. The pumping system includes a pumping unit base comprising a plurality of driven piles installed in the ground, and a metal platform fixedly attached to the plurality of driven piles, wherein the metal platform is positioned above the ground, and a pumping unit installed on the metal platform.

BRIEF DESCRIPTION OF THE DRAWINGS

So that the manner in which the above recited features of the present disclosure can be understood in detail, a more particular description of the various aspects, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 1D is a schematic sectional view of the pumping unit base of FIG. 1A.

FIGS. 4A-4J are schematic views showing a method for removing and reinstalling a pumping unit base according to one embodiment of the present disclosure.

Figure 1A:
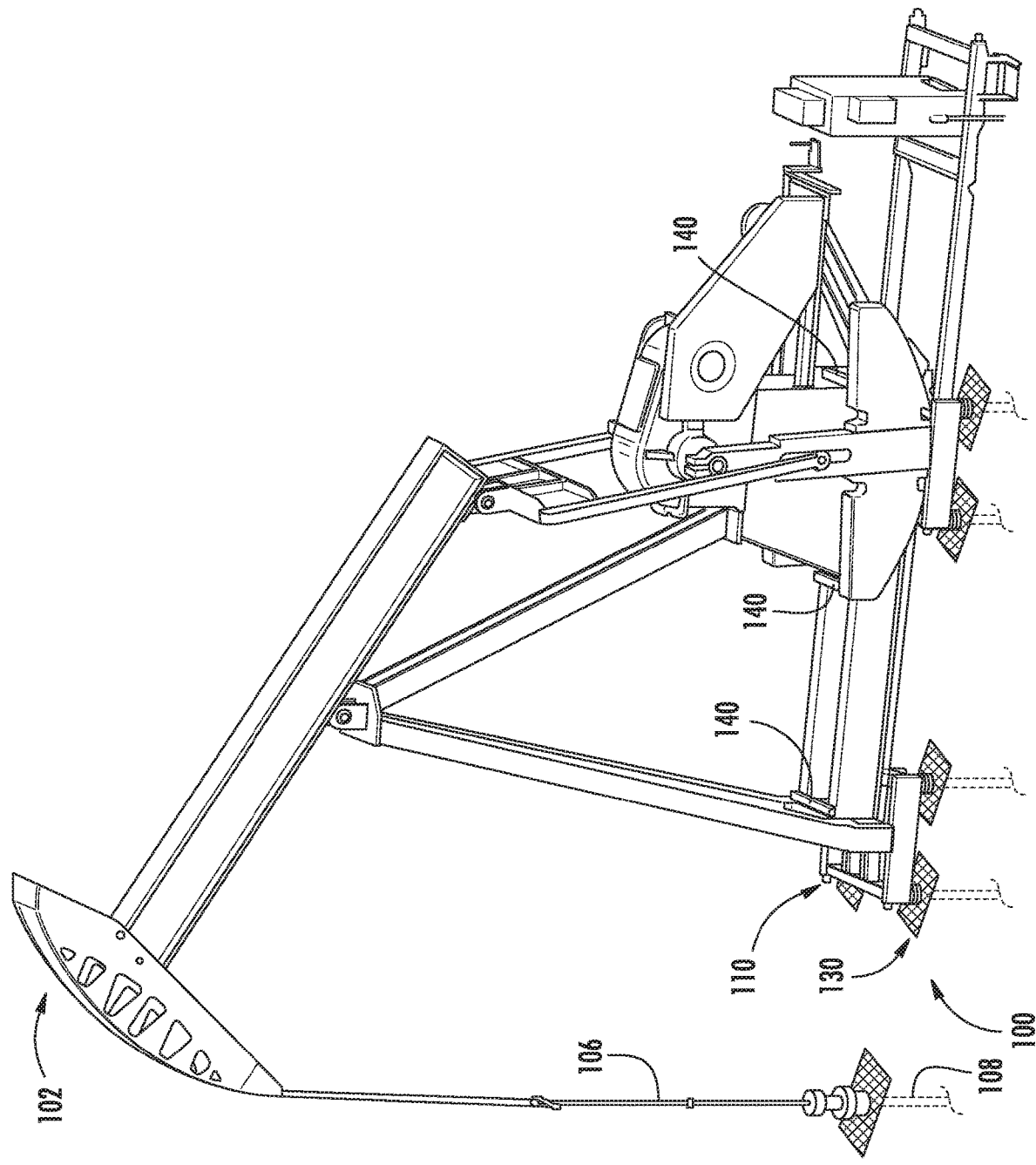
FIG. 1A is a schematic perspective view of a pumping unit base for a traditional pumping unit.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

In the following description, numerous specific details are set forth to provide a more thorough understanding of the present disclosure. However, it will be apparent to one of skill in the art that the present disclosure may be practiced without one or more of these specific details. In other instances, well-known features have not been described in order to avoid obscuring the present disclosure.

Embodiments of the present disclosure relates to pumping unit bases having a metal platform attached to a pile arrangement. In one embodiment, the pile arrangement may include two or more metal tubulars driven into solid to a predetermined the length. The metal platform may be fixedly attached to the pile arrangement. In one embodiment, the metal platform may be attached to the pile arrangement by welding. During operation, the metal platform may be removed from the pile arrangement, for example, by cutting the tubulars in the pile arrangement, to allow additional operation near the pile arrangement. The metal platform may then be reattached to the pile arrangement to resume production.

In addition to permitting removal and reattachment, the all metal assemble of platform and driven piles may be designed as a system using available design tools, therefore, improving reliability and/or reducing cost.

FIG. 1A is a schematic perspective view of a pumping unit base 100 according to one embodiment of the present disclosure. The pumping unit base 100 is configured to support a traditional pumping unit 102. In one embodiment, the pumping unit base 100 includes a pile arrangement 110 and a platform 130 fixedly attached to the pile arrangement 110. The pumping unit 102 may be installed on the on the platform 130 to operate a rod string 106 to produce oil and gas from a wellbore 108.

Figure 1B:
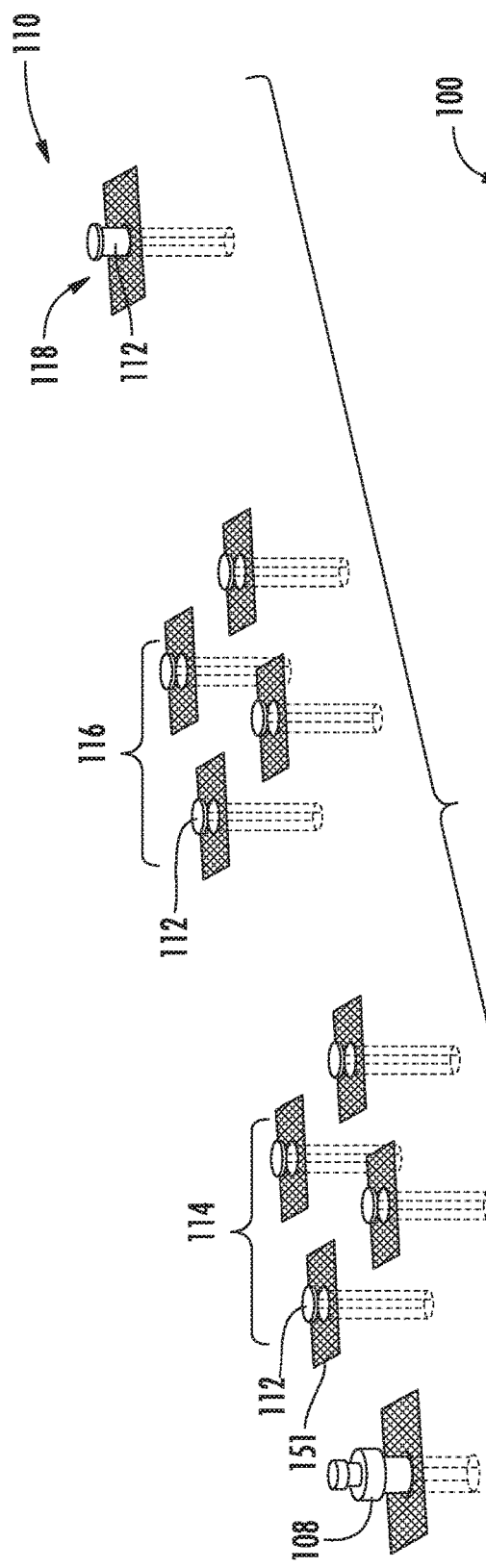
FIG. 1B is a perspective view of a pile arrangement for the pumping unit base of FIG. 1A.

FIG. 1B is a perspective view of the pile arrangement 110. The pile arrangement 110 includes a plurality of driven piles 112 installed in the soil near the wellbore 108.

Figure 1C:
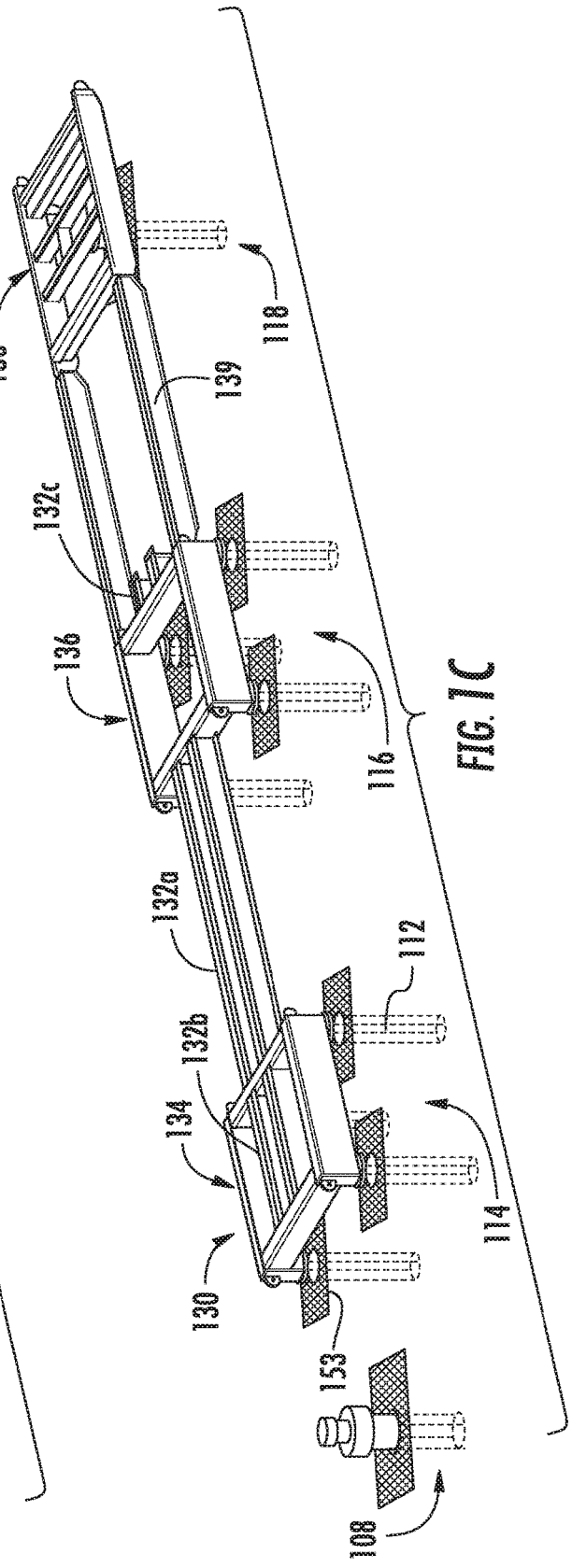
FIG. 1C is a perspective view of the pumping unit base of FIG. 1A.
Figure 1E:
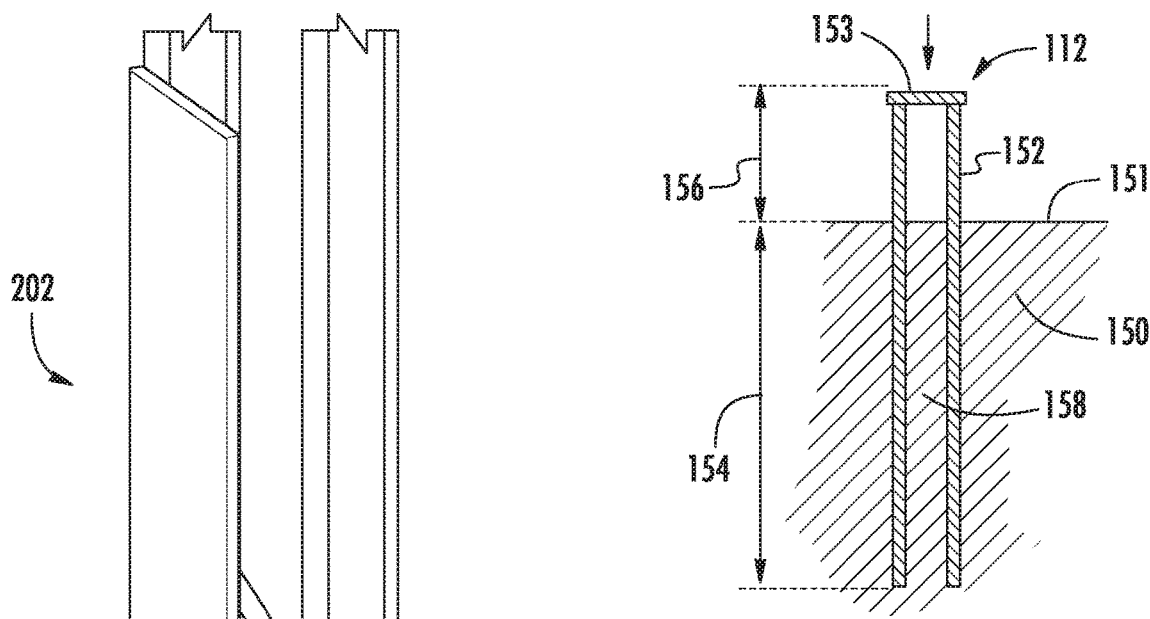
FIG. 1E is a schematic sectional view of a driven pile.

FIG. 1E is a schematic sectional view of the driven pile 112 according to one embodiment of the present disclosure. The driven pile 112 is installed by driving a tubular 152 into a preselected location in the soil 150. The tubular 152 may be installed substantially along a vertical direction. The tubular 152 may be formed from a metal, such as steel. The tubular 152 has a central bore 158 which allows minimal disturbance to the soil 150. The driven pile 112 may be installed using any suitable pile driven mechanisms, such as a vibratory hammer, a drop hammer, a steam hammer, and a diesel hammer.

The tubular 152 may be driven to the soil 150 to a predetermined depth based on soil conditions or to a resistance based on an ultimate load bearing capacity designed for the driven pile 112. A load capacity of the driven pile 112 may be determined by various approaches. For example, the load capacity of the driven pile 112 may be determined by the distance the tubular 152 moves downwards under a hammer strike. In one embodiment, local building or road construction guidelines may be used to determine the load capacity of the driven pile 112. Generally, the target load capacity of the plurality of driven pile 112 may be large enough to sustain the weight of the pumping unit 102 and the rod string 106, and to sustain the dynamic load caused by the motion of the pumping unit 102 and the rod string 106. Each driven pile 112 may include one or more links of tubulars. When one link of tubular 152 is hammered close to the surface 151 of the soil 150, a new link of tubular may be welded to the tubular 152 to allow the driven pile 110 to go deeper.

When the tubular 152 is hammered to the desired movement under the predetermined force, the tubular 152 may have a depth 154 under the surface 151 and the tubular 152 above the surface 151 may be cut off to a predetermined length 156 to allow attachment of the platform 130. In one embodiment, a disk 153 may be attached to the tubular 152. The disk 153 may be attached to the tubular 152 by welding. The disk 153 provides surface areas on the driven pile 112 for attaching the platform 130.

Returning to FIG. 1B, the driven piles 112 in the pile arrangement 110 may be arranged into a front group 114 and a back group 116 for supporting the front end and the back end of the pumping unit 102 respectively. In one embodiment, the front group 114 may include four driven piles 112 arranged in a rectangle. The back group 116 may include four driven piles 112 arranged in a rectangle. The driven piles 112 in the front group 134 and the driven piles 112 in the back group 116 may be designed to sustain different dynamic loads, thus, driven to different depth.

The pile arrangement 110 may include an optional tail group 118 for supporting accessories, such as hydraulic power unit, of the pumping unit 102. In one embodiment, the tail group 118 includes one driven pile 112. The tail group 118 may be designed to support the weight of the accessories.

FIG. 1C is a perspective view of the pumping unit base 100 showing the platform 130 attached to the pile arrangement 110. The platform 130 may be formed from metal beams, such as steel beams. The platform 130 may be fixedly attached to the pile arrangement 110. In one embodiment, the platform 130 may be attached to the pile arrangement 110 by welding.

In one embodiment, the platform 130 may include a front pad 134 and a back pad 136. The front pad 134 may be a rectangular frame corresponding to the rectangular shape of the front group 114 of the pile arrangement 110. In one embodiment, each drive pile 112 in the front group 114 may be attached to the front pad 134 at each corner of the front pad 134. The back pad may be a rectangular frame corresponding to the rectangular shape of the back group 116 of the pile arrangement 110.

In one embodiment, the platform 130 may include a tail pad 138. The tail pad 138 may be attached to the tail group 118 of the pile arrangement 110. The tail pad 138 may include a framework for supporting accessories, such as power units to the pumping unit 102. In one embodiment, the tail pad 138 may be connected to the back pad 136 by connector 139. Alternatively, the tail pad 138 may be a stand alone structure from the front pad 134 and the back pad 136.

The front pad 134 and the back pad 136 may be connected by connector 132a. In one embodiment, the connector 132a may have rails extending between the front pad 134 and the back pad 136. The connector 132a may also be used to secure a pumping unit. In one embodiment, rails 132b may be disposed within the front pad 134. Similar to the connectors 132a, the rails 132b may be used to secure the pumping unit 102 to the front pad 134. In one embodiment, rails 132c may be attached to the back pad 136. The rails 132c may be used to attach the pumping unit 102 to the back pad 136.

FIG. 1D is a schematic sectional view of the pumping unit base 100 with the pumping unit 102. The platform 130 is fixedly attached to the pipe arrangement 110. In one embodiment, the platform 130 is welded to the disk 153 on each pile 112. Alternatively, the platform 130 may be attached to the pipe arrangement 110 by any suitable fasteners, such as bolts, screws, threaded connections, so the like.

A bottom surface 103 may be rested on a top surface 142 of the front pad 134 and a top surface 144 of the back pad 136 so the front pad 134 and the back pad 136 bear the weight and load of the pumping unit 102. The pumping unit 102 may be attached to the pumping unit base 100 by fasteners 140. In one embodiment, the fasteners 140 may be bolts and nuts. As shown in FIG. 1D, the pumping unit 102 may be attached to the platform 130 at the rails 132a, 132b, 132c.

Figure 2A:
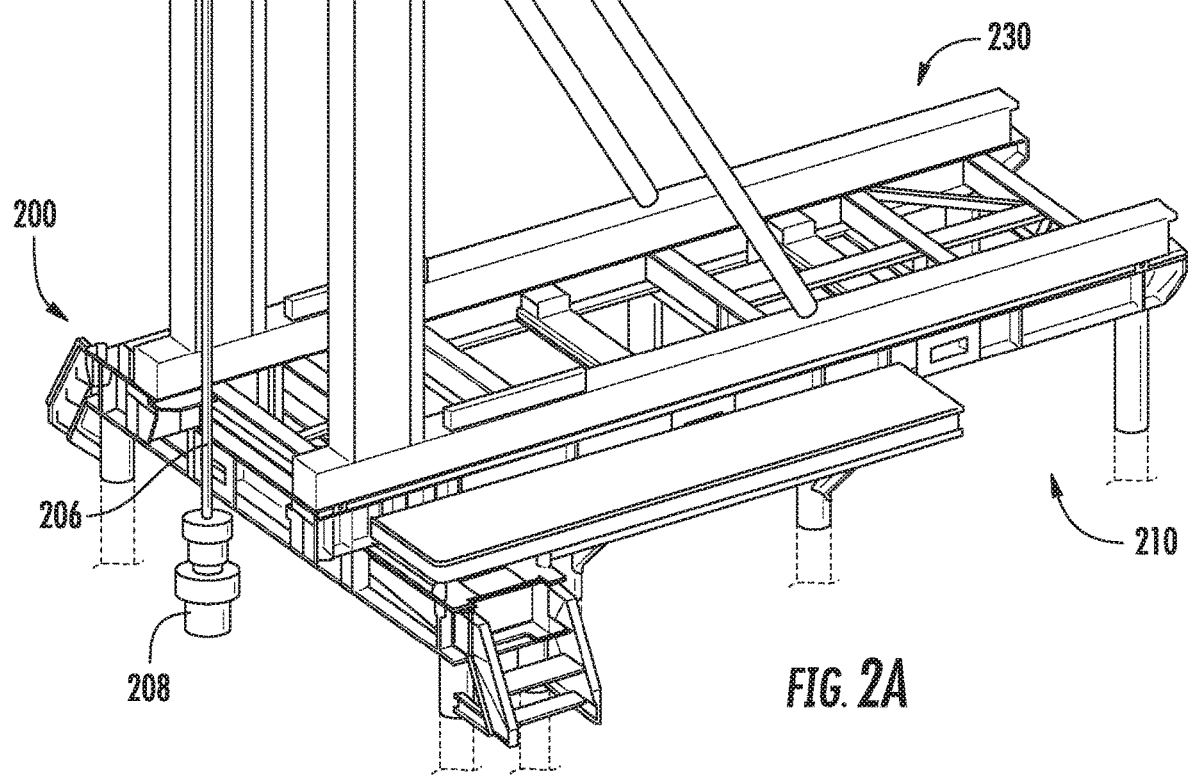
FIG. 2A is a schematic perspective view of a pumping unit base for a vertical pumping unit.

FIG. 2A is a schematic perspective view of a pumping unit base 200 according to one embodiment of the present disclosure. The pumping unit 200 is configured to support for a long-stroke pumping unit 202, such as a ROTAFLEX® unit by Weatherford Technology, Inc. The pumping unit 202 may include a vertical body 205 supported by two tracks 203.

In one embodiment, the pumping unit base 200 includes a pile arrangement 210 and a platform 230 fixedly attached to the pile arrangement 210. The pumping unit 202 may be installed on the on the platform 230 to operate a rod string 206 to produce oil and gas from a wellbore 208.

Figure 2B:
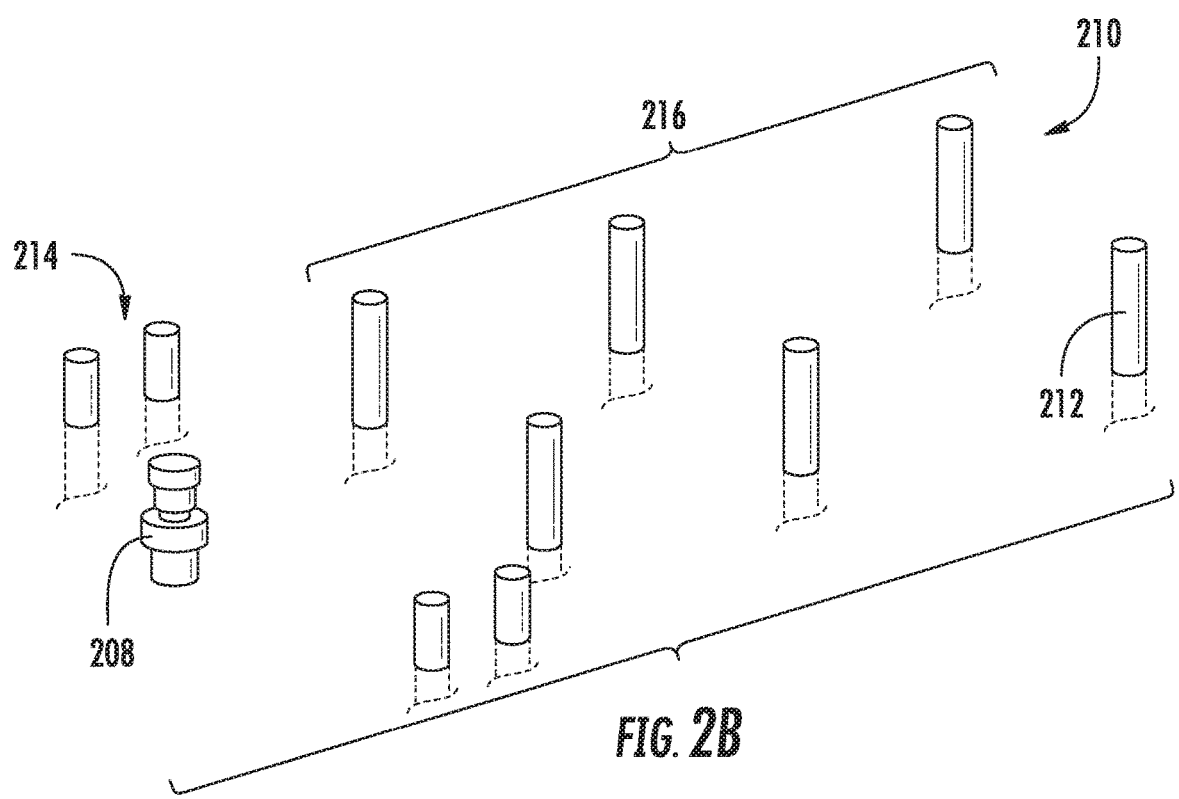
FIG. 2B is a perspective view of a pile arrangement for the pumping unit base of FIG. 2A.

FIG. 2B is a perspective view of the pile arrangement 210. The pile arrangement 210 includes a plurality of driven piles 212 installed in the soil near the wellbore 208. Each driven pile 212 may be similar to the driven pile 112 of FIG. 1E. The driven piles 212 in the pile arrangement 210 may be arranged in pairs to support an elongated platform. In one embodiment, the pile arrangement 210 may form a front group 214 and a back group 216 for supporting the pumping unit 202 respectively. The front group 214 may include four driven piles 212 enclosing a rectangular area adjacent the wellbore 208. The driven piles 212 in the front group 214 may be wide apart from the wellbore 208 to permit installation of the driven piles 212. The back group 216 may include four or more driven piles 212 arranged in a rectangle for supporting the tracks 203 of the pumping unit 202. The driven piles 212 of the back group 216 may be arranged in pairs at different intervals to accommodate weight and load distribution of the pumping unit 202. The driven piles 212 of the back group 216 may extend from the ground surface at a higher level than the drive piles 212 of the front group 214.

Figure 2C:
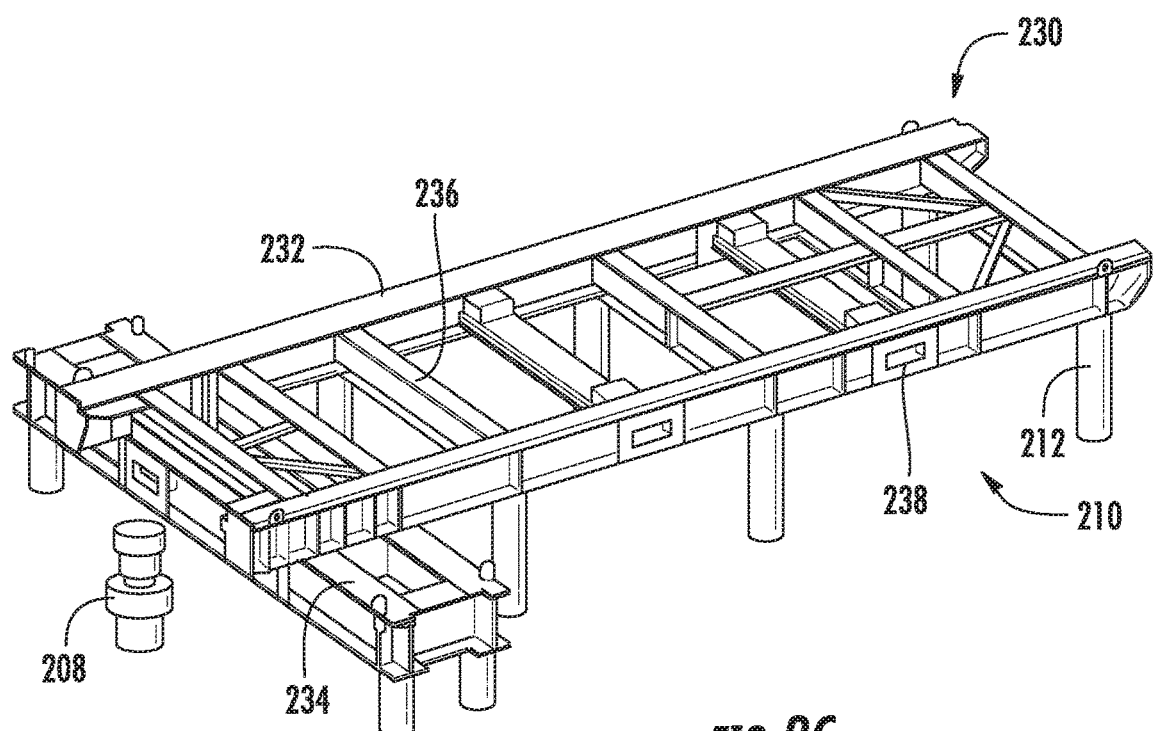
FIG. 2C is a perspective view of the pumping unit base of FIG. 2A.

FIG. 2C is a perspective view of the pumping unit base 200 showing the platform 230 attached to the pile arrangement 210. The platform 230 may be formed from metal beams, such as steel beams. The platform 230 may be fixedly attached to the pile arrangement 210. In one embodiment, the platform 230 may be attached to the pile arrangement 230 by welding.

In one embodiment, the platform 230 may include a bottom pad 234 and a top pad 236. The bottom pad 234 may be a rectangular frame corresponding to the rectangular shape of the front group 214 of the pile arrangement 210. The top pad 234 may be a rectangular frame disposed over the bottom pad 234 and the back group 216 of the pile arrangement 210. In one embodiment, the bottom pad 224 and the top pad 236 may be joined together, for example by welding. The top pad 236 may have two beams 232 for supporting the tracks 203 of the pumping unit 202. In one embodiment, one or more lift pockets 238 may be formed on the beams 232 to allow the platform 230 to be lifted during installation, removable, or reinstallation.

Figure 2D:
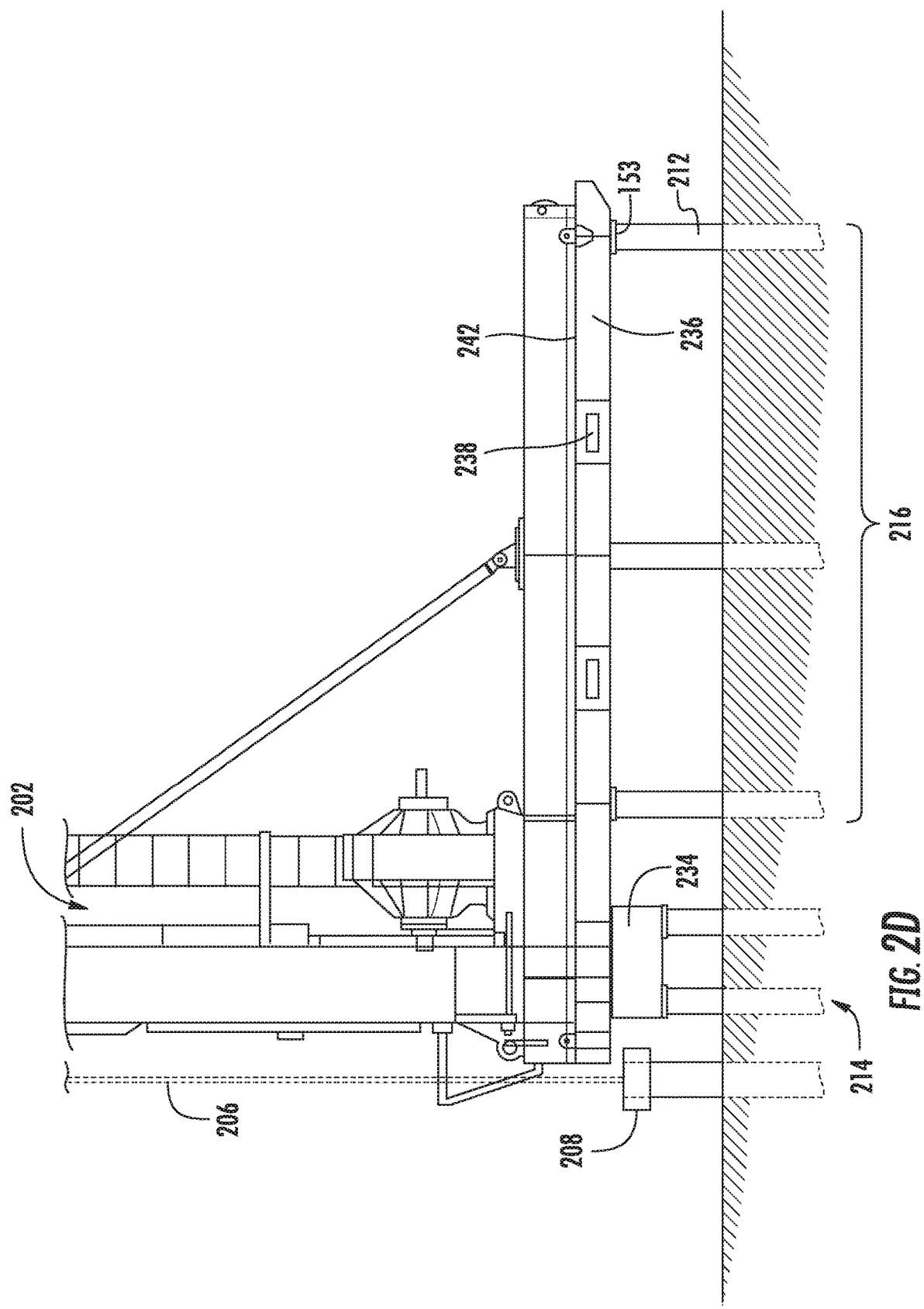
FIG. 2D is a schematic sectional view of the pumping unit base of FIG. 2A.

FIG. 2D is a schematic sectional view of the pumping unit base 200 with the pumping unit 202. The platform 230 is fixedly attached to the pipe arrangement 210. In one embodiment, the platform 230 is welded to the disk 153 on each pile 212. Alternatively, the platform 230 may be attached to the pipe arrangement 210 by any suitable fasteners, such as bolts, screws, threaded connections, brackets, and the like.

The tracks 203 of the pumping unit 202 may be rested on a top surface 242 of the top pad 236 so the platform 230 bears the weight and load of the pumping unit 202. In one embodiment, the pumping unit 202 may be secured to the platform 230 by fasteners 240. The fasteners 240 may be any suitable fasteners, such as brackets, bolts, bolts and nuts, threaded connections, and the like.

Figure 3A:
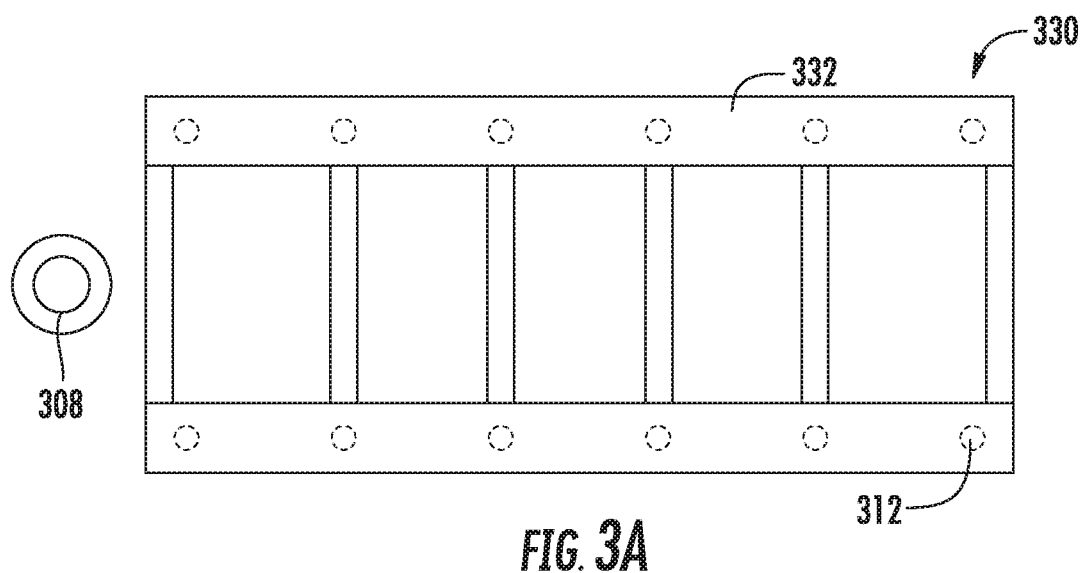
FIGS. 3A and 3B are schematic views of a pumping unit base according to another embodiment of the present disclosure.
Figure 3B:
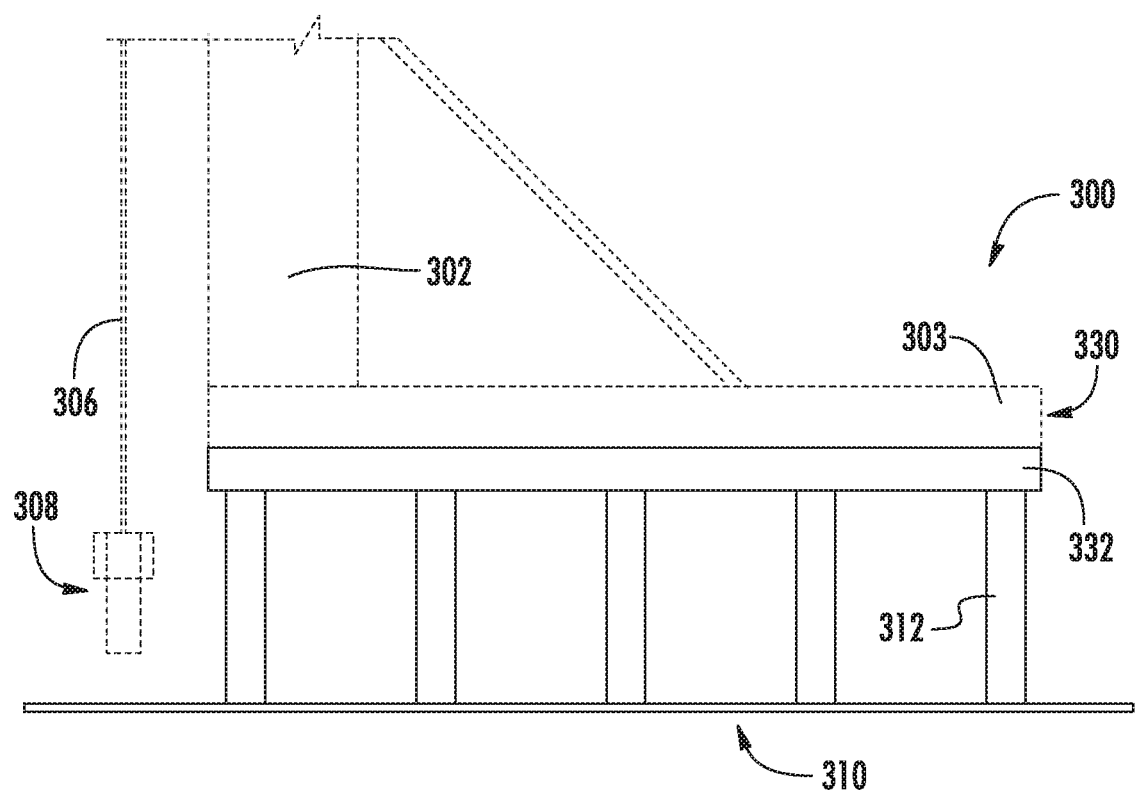

FIGS. 3A and 3B are schematic views of a pumping unit base 300 according to another embodiment of the present disclosure. The pumping unit base 300 is similar to the pumping unit base 200.

The pumping unit base 300 includes a pile arrangement 310 and a platform 330 fixedly attached to the pile arrangement 310. A pumping unit 302 may be installed on the on the platform 330 to operate a rod string 306 to produce oil and gas from a wellbore 308.

The pile arrangement 310 includes a plurality of driven piles 312 installed in the soil near the wellbore 308. The driven piles 312 in the pile arrangement 310 may be arranged in pairs. The driven piles 312 may be arranged in pairs at different intervals to accommodate weight and load distribution of the pumping unit 302.

The platform 330 may be formed from metal beams, such as steel beams. The platform 330 may be fixedly attached to the pile arrangement 310. In one embodiment, the platform 330 may be attached to the pile arrangement 330 by welding.

The platform 330 may be a rectangular frame disposed over the pile arrangement 310. The platform 330 may have two beams 332 for supporting the tracks 303 of the pumping unit 302.

Pumping unit bases according to the present disclosure, such as the pumping unit base 100, 200, 300, may be removed to allow operations around the wellbore and reinstalled for further production. FIGS. 4A-4J are schematic views showing a method for installing, removing and reinstalling a pumping unit base according to one embodiment of the present disclosure.

Figures 4I, 4J:
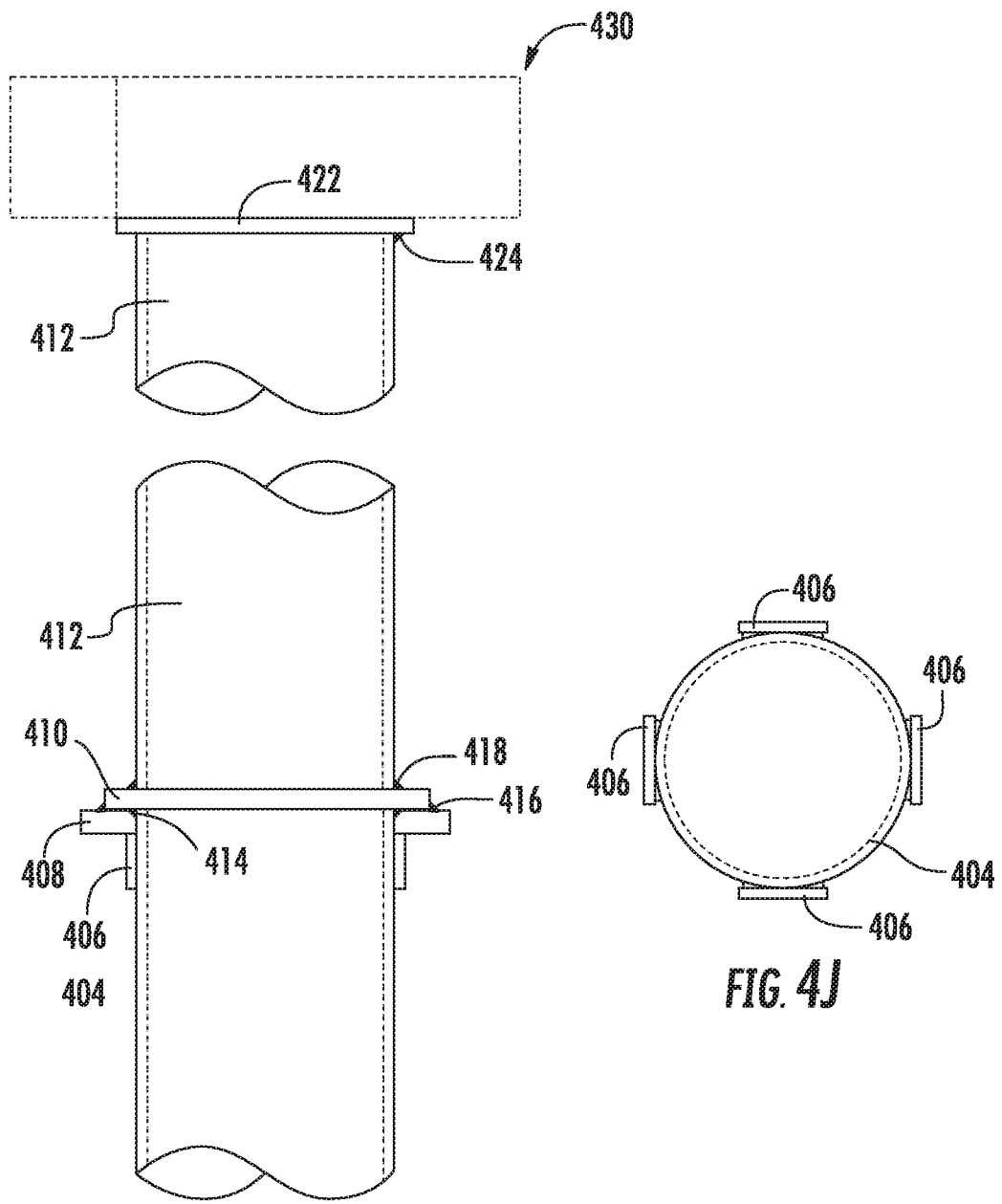

FIG. 4A is a schematic perspective view of a driven pile 404 being installed into soil 404 in a preselected location. The driven pile 404 may be any of the driven piles in the pumping unit base of the present disclosure. The process described in FIGS. 4A-4J may be applied to each of the plurality of driven piles in the pumping unit base. The driven pile 404 may be installed by hammering into the soil.

In FIG. 4B, the driven pile 404 is driven to a predetermined depth, for example, a depth where the driven pile 404 is resistant under a target load capacity. In one embodiment, the driven pile 404 may be trimmed to a desired height. In one embodiment, the driven pile 404 may be trimmed to a height that is about 5 to 6 inches below the ground level 401 of the soil 402. A small amount of soil may be removed around the driven pile 404 to trim the driven pile 404 below the ground level 401.

In FIGS. 4C and 4D, a splice assembly 420 may be attached to the top of the driven pile 404 for connecting to a corresponding platform. The splice assembly 420 may include a ring 408 attached the top of the driven pile 404 on an outer surface. The ring 408 may be attached to the driven pile 404 by welding. Alternatively, other suitable connections, such as threaded connections, nuts and bolts, and brackets.

Optionally, one or more alignment blocks 406 may be attached to the driven pile 404 to align the ring 408. FIG. 4J is a schematic top view of the driven pile 404 with the alignment blocks 406.

A disk 410 is attached to the ring 408 and the driven pile 404. The disk 410 may be welded to the ring 408 and the driven pile 404. The disk 410 provides a surface area for attaching a platform to the driven pile 404. After the disk 410 is attached, previously removed dirt may be replaced over the driven pile 404 until it is time to attach a platform.

In FIG. 4E, a platform 430 may be lowered towards the driven pile 404 for attachment. The platform 430 may be formed from steel beams as the platforms 130, 230, and 330 described above. Alternatively, the platform 430 may be a traditional concrete pad. In one embodiment, an extension tube 412 may be first attached to the platform 430 and then spliced to the driven pile 404 through the splice assembly 420. The extension tube 412 may have the same diameter of the driven pile 404. The extension tube 412 may be fixedly attached to the platform 430 by welding or any suitable mechanism. In one embodiment, the extension tube 412 may be long enough to position the platform 430 above the ground level 401 so that settling or other soil variation would not affect the platform 430.

In FIG. 4F, the extension tube 412 is joined to the driven pile 404 at the disk 410. In one embodiment, the extension tube 412 may be joined to the disk 410 by welding. Alternatively, the extension tube 412 and the disk 410 may be joined together by any suitable mechanisms, such as bolts and nuts, brackets, or threaded connection.

FIG. 4I schematically illustrates connections between the platform 430 and the driven pile 404 according to one embodiment of the present disclosure. The ring 408 may be joined to the driven pile 404 by a welding joint 414 between an inner diameter of the ring 408 and an outer diameter of the driven pile 404. An outer diameter of the ring 410 may be larger than an outer diameter of the disk 410. The disk 410 may be joined to the ring 408 by a welding joint 416 around the outer diameter of the disk 410. The extension tube 412 may be joined to the disk 410 by a welding joint 418 at an outer diameter of the extension tube 412. In one embodiment, the platform 430 may include a disk or a plate 422 for joining the extension tube 412. For example, the extension tube 412 may be joined to the platform 430 by a welding joint around the outer diameter of the extension tube 412. In one embodiment, a corrosion resistant coating may be applied over one or more welding joints 414, 416, 418, 420.

After the platform 430 is attached to the driven pile 404, as shown in FIG. 4F, a pumping unit may be installed on the platform 430 for production. During operation, when there is a need to remove the pumping unit temporarily, for example to restructure the driven piles, to reposition the driven piles for a different pumping unit, to rework the wellbore, or to drill a new wellbore near the pumping unit base with a rig, the platform 430 may be removed according to embodiments of the present disclosure.

Alternatively, the splice assembly 420 is not added to the driven pile 404. The driven pile 404 may be trimmed to above the ground level at a desired length, such as between 12 inches to about 18 inches. The platform 430 may be directly attached to the driven pile 404.

Prior to removing the platform 430, the pumping unit attached to the platform 430 may be first removed. Lifting equipment, such as a crane, may be hooked on the platform 430 to pull the weight of the platform 430 as safety measure. Then each extension tube 412 may be separated from the driven pile 404, for example by torching the welding joint 418 or by releasing connection between the driven pile 404 and the extension tube 412. When the platform 430 is separated from all the driven piles 404, the platform 430 may be moved off of location. FIG. 4G schematically illustrates the platform 430 being lifted up from the driven pile 404.

In case, the splice assembly 420 is not present in the driven pile 404, a welding torch may be used to cut off the driven pile 404 at a predetermined length below the platform 430. After the platform 430 is removed, a splice assembly 420 may be attached to the remaining driven pile 404 as shown in FIGS. 4C-4D for reinstalling the platform 430.

In FIG. 4H, soil may be replaced over the driven pile 404 to allow operations of other equipment near the wellbore. When it is time to reinstall the platform 430, the driven pile 404 may be dug up to expose the disk 410. The platform 430 may be reinstalled as described in FIGS. 4E-4F.

Compared to the state-of-art pumping unit bases, the pumping unit bases according to the present disclosure demand minimal or no excavation, therefore, reducing costs and time. The pumping unit bases according to the present disclosure also easily and simply installed. The pumping unit base may be removed and reinstalled to provide flexibility to oil field operation.

Embodiments of the present disclosure provide a pumping unit base. The pumping unit base includes a plurality of driven piles installed in the ground, and a metal platform fixedly attached to the plurality of driven piles, wherein the metal platform is positioned above the ground.

In one or more embodiments, the metal platform is attached to the plurality of driven piles by welding.

In one or more embodiments, each of the plurality of driven piles is driven in the ground to a predetermined depth or until the driven pile is driven to a resistance corresponding to a target load.

In one or more embodiments, the plurality driven piles form a first group including two or more of the plurality of driven piles, wherein each driven pile in the front group is installed to support a first load, and a second group including two or more of the plurality of driven piles, wherein each driven pile in the second group is installed to support a second load different from the first load.

In one or more embodiments, the metal platform comprises a first pad attached to the driven piles in the first group of driven piles, and a second pad attached to the drive piles in the second group of driven piles, wherein the first pad and the second pad are connected by a connector.

In one or more embodiments, the metal platform comprises a lower pad attached to the driven piles in the first group, and an upper pad attached to the lower pad and the second group of driven piles.

In one or more embodiments, the plurality of driven piles are arranged in pairs to support an elongated frame of the platform.

In one or more embodiments, each of the driven pile includes a splice assembly connecting a first tubular install in the ground and a second tubular attached to the metal platform.

In one or more embodiments, the splice assembly comprises a ring attached to an outer diameter of the first tubular, and a disk attached to the ring, wherein the second tubular is attached to the disk at an outer diameter of the second tubular.

In one or more embodiments, the ring and the disk are attached to the first tubular and the second tubular by welding.

Embodiments of the present disclosure further provide a method for producing oil and gas from a wellbore. The method includes installing a plurality of driven piles into the ground near the wellbore, attaching a metal platform to the plurality of driven piles, installing a pumping unit on to the metal platform, and producing oil and gas from the wellbore with the pumping unit.

In one or more embodiments, the method further comprising cutting the plurality of driven piles at a level below a top surface of the ground to remove the metal platform from the driven piles, and covering the driven piles to allow an operation around the wellbore with other equipment.

In one or more embodiments, the method further comprising reconnecting the metal platform to the plurality of driven piles after completion of the operation with other equipment, and reinstalling the pumping unit to the metal platform and resuming producing oil and gas from the wellbore.

In one or more embodiments, reconnecting the metal platform comprises attaching a splice assembly on top of each driven pile, and attaching the splice assembly on each driven pile to a tubular connected to the metal platform.

In one or more embodiments, attaching the splice assembly comprises attaching a ring around an outer surface of the driven pile, and attaching a disk to the ring.

In one or more embodiments, installing the plurality of driven piles comprises driving each of the plurality of driven piles into the ground to a predetermined depth or until the driven pile is driven to a resistance corresponding to a target load.

In one or more embodiments, installing the plurality of driven piles further comprising cutting each driven pile at a level under a top surface of the ground, attaching a splice assembly to each driven pile, and attaching a tubular extending from the platform to the splice assembly on each driven pile.

In one or more embodiments, at least one of the plurality of driven piles is driven to a first resistance corresponding to a first load capacity, and at least one of the plurality of driven piles is driven to a second resistance corresponding to a second load capacity different from the first load capacity.

In one or more embodiments, the pumping unit is a vertical pumping unit.

In one or more embodiments, the pumping unit is a traditional reciprocating pumping unit.

Another embodiment of the present disclosure provides a pumping system. The pumping system includes a pumping unit base comprising a plurality of driven piles installed in the ground, and a metal platform fixedly attached to the plurality of driven piles, wherein the metal platform is positioned above the ground, and a pumping unit installed on the metal platform.

In one or more embodiments, the pumping unit is one of a vertical pumping unit and a traditional reciprocating pumping unit.

While the foregoing is directed to embodiments of the present disclosure, other and further embodiments may be devised without departing from the basic scope thereof, and the scope thereof is determined by the claims that follow.

The invention claimed is:

1. A pumping system, comprising:
a pumping unit base, comprising:
  a plurality of driven piles installed in a ground, each pile having a first pile end;
  a splice assembly for each pile, wherein the splice assembly is connected to the first pile end after the pile has been installed in the ground, wherein each splice assembly comprises:
    a ring attached to an outer diameter of the respective pile; and
    a disk attached to the ring; and
  a metal platform having a plurality of tubulars, wherein each tubular has a first tubular end, wherein the splice assembly is connected to the first tubular end, wherein the tubular is attached to the respective disk at an outer diameter of the tubular.

2. The pumping system of claim 1, wherein the ring and the disk are attached to the pile and the tubular by welding.

3. The pumping system of claim 1, wherein each of the plurality of driven piles is driven in the ground to a predetermined depth or until the driven pile is driven to a resistance corresponding to a target load.

4. The pumping system of claim 3, wherein the plurality driven piles form:
a first group including two or more of the plurality of driven piles, wherein each driven pile in the first group is installed to support a first load; and
a second group including two or more of the plurality of driven piles, wherein each driven pile in the second group is installed to support a second load different from the first load.

5. The pumping system of claim 4, wherein the metal platform comprises:
a first pad attached to the driven piles in the first group of driven piles; and
a second pad attached to the driven piles in the second group of driven piles, wherein the first pad and the second pad are connected by a connector.

6. The pumping system of claim 4, wherein the metal platform comprises:
a lower pad attached to the driven piles in the first group; and
an upper pad attached to the lower pad and the second group of driven piles.

7. The pumping system of claim 1, wherein the plurality of driven piles are arranged in pairs to support an elongated frame of the platform.

8. The pumping system of claim 1, wherein the metal platform is positioned above the ground.

9. The pumping system of claim 1, further comprising:
a pumping unit connected to the pumping unit base.

10. A pumping system, comprising:
a pumping unit base comprising:
  a plurality of driven piles installed in a ground, wherein each pile is fixedly attached to a respective splice assembly of a plurality of splice assemblies; and
  a metal platform having a plurality of tubulars corresponding to the plurality of driven piles;
wherein each splice assembly is attached to a respective tubular of the plurality of tubulars and a respective pile of the plurality of driven piles after the plurality of piles are installed in the ground, wherein each splice assembly includes:
a ring attached to an outer diameter of the respective pile; and
a disk attached to the ring, wherein the respective tubular is attached to the disk at an outer diameter of the respective tubular; and
a pumping unit installed on the metal platform.

11. The pumping system of claim 10, wherein the pumping unit is one of a vertical pumping unit and a traditional reciprocating pumping unit.

12. The pumping system of claim 10, wherein the metal platform is positioned above the ground.

13. A pumping system, comprising:
a pumping unit base, comprising:
  a plurality of driven piles installed in a ground, wherein each pile has a pile end above the ground;
  a platform having a plurality of tubulars extending from the platform; and
  a splice assembly connecting each driven pile with a respective tubular of the plurality of tubulars, wherein the respective pile end and the respective tubular are attached to the splice assembly, wherein each splice assembly comprises:
    a ring attached to an outer diameter of the respective pile; and
    a disk attached to the ring, wherein the respective tubular is attached to the disk at an outer diameter of the tubular.

14. The pumping system of claim 13, wherein the platform is positioned above the ground.

15. The pumping system of claim 13, wherein the platform is a concrete pad.

16. The pumping system of claim 13, wherein the platform is a formed of metal.

17. The pumping system of claim 13, wherein each tubular is detachable from the respective splice assembly.

18. The pumping system of claim 13, further comprising:
a pumping unit connected to the pumping unit base.

* * * * *